US012675381B2

(12) United States Patent
Xiao et al.

(10) Patent No.: US 12,675,381 B2
(45) Date of Patent: Jul. 7, 2026

(54) DEVICE ERROR PRIORITY ASSIGNMENT GENERATION FOR SMART CART SYSTEMS

(71) Applicant: Maplebear Inc., San Francisco, CA (US)

(72) Inventors: Hua Xiao, Toronto (CA); Naval Shah, Toronto (CA); Brent Scheibelhut, Toronto (CA); Mark Oberemk, Toronto (CA); Michael John Remmer Ryzewic, Ithaca, NY (US); Charles Wesley, San Diego, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 18/890,517

(22) Filed: Sep. 19, 2024

(65) Prior Publication Data

US 2026/0079804 A1 Mar. 19, 2026

(51) Int. Cl.
 *G06F 11/30* (2006.01)
 *G06F 9/451* (2018.01)
(52) U.S. Cl.
 CPC .......... *G06F 11/3013* (2013.01); *G06F 9/451* (2018.02)
(58) Field of Classification Search
 CPC .............................. G06F 11/3013; G06F 9/451
 USPC .......................................................... 714/57
 See application file for complete search history.

(56) References Cited

U.S. PATENT DOCUMENTS

2020/0027148 A1* 1/2020 Li ...................... G06Q 30/0631
2023/0041775 A1 2/2023 Glaser et al.

OTHER PUBLICATIONS

Patent Cooperation Treaty, International Search Report and Written Opinion, PCT Application No. PCT/US2025/045080, Nov. 20, 2025, 15 pages.

* cited by examiner

*Primary Examiner* — Yair Leibovich
(74) *Attorney, Agent, or Firm* — Fenwick & West LLP

(57) ABSTRACT

A cart management system generates an error priority assignment for smart cart systems based on device error predictions for those smart cart systems. An error priority assignment is an assignment of the relative priority of servicing or providing maintenance to a set of smart cart systems. To generate the error priority assignment, the cart management system applies an error detection model to cart data received from the set of smart cart systems. The cart data has measurements captured by sensors coupled to the smart cart systems, and the error detection model uses the cart data to generate device error predictions. Each of these predictions represents a likelihood that a smart cart system will experience a device error within some time period. The cart management system uses the device error predictions to generate the error priority assignment and selects which smart cart system to service based on the error priority assignment.

20 Claims, 3 Drawing Sheets

DEVICE ERROR PRIORITY ASSIGNMENT GENERATION FOR SMART CART SYSTEMS

BACKGROUND

Smart cart systems are complex systems that use a variety of hardware and software solutions to perform their functionalities. For example, these systems may have many different sensors that capture measurements of items added to a storage area or an environment around the smart cart system, may have mechanical components that provide for mobility of the cart (e.g., wheels), and operating systems or client applications operating on computing systems that execute machine-learning models for item detection. These systems can experience device errors that must be addressed by a human present at the smart cart system. For example, wheels or sensors may need to be replaced, batteries may need to be charged, or software may need to be updated. These device errors, if not addressed, can seriously degrade the performance of the smart cart system or leave a smart cart system out of commission for use by users.

SUMMARY

In accordance with one or more aspects of the disclosure, a cart management system generates an error priority assignment for smart cart systems based on device error predictions for those smart cart systems. An error priority assignment is an assignment of the relative priority of servicing or providing maintenance to a set of smart cart systems. For example, the error priority assignment may be a ranked list of the set of smart cart systems or a schedule that indicates when each smart cart system should be serviced.

To generate the error priority assignment, the cart management system applies an error detection model to cart data received from the set of smart cart systems. The cart data has measurements captured by sensors coupled to the smart cart systems, and the error detection model uses the cart data to generate device error predictions. Each of these predictions represents a likelihood that a smart cart system will experience a device error within some time period (e.g., within the next 24 hours or during the next calendar month). In some embodiments, the device error model generates a set of device error predictions, where each of these predictions represents a predicted likelihood of a device error of a particular type will occur for a smart cart system.

The cart management system uses the device error predictions to generate the error priority assignment. For example, the cart management system may apply an optimization algorithm to minimize an overall likelihood that a device error occurs among any of the smart cart systems. Similarly, the cart management system may weight the device error predictions based on a hierarchy of device error types and optimize for a minimum total expected value of device errors for the set of smart cart systems.

The cart management system uses the error priority assignment to select which smart cart system to service and notifies users associated with the cart management system of the smart cart system to be serviced. The cart management system may also instruct the selected smart cart system to present a user interface on its display instructing users not to use the smart cart system until it is serviced. The cart management system may also instruct other smart cart systems to display user interfaces instructing users to use those smart cart systems instead.

DETAILED DESCRIPTION

Example System Environment for Smart Cart System

Figure 1:
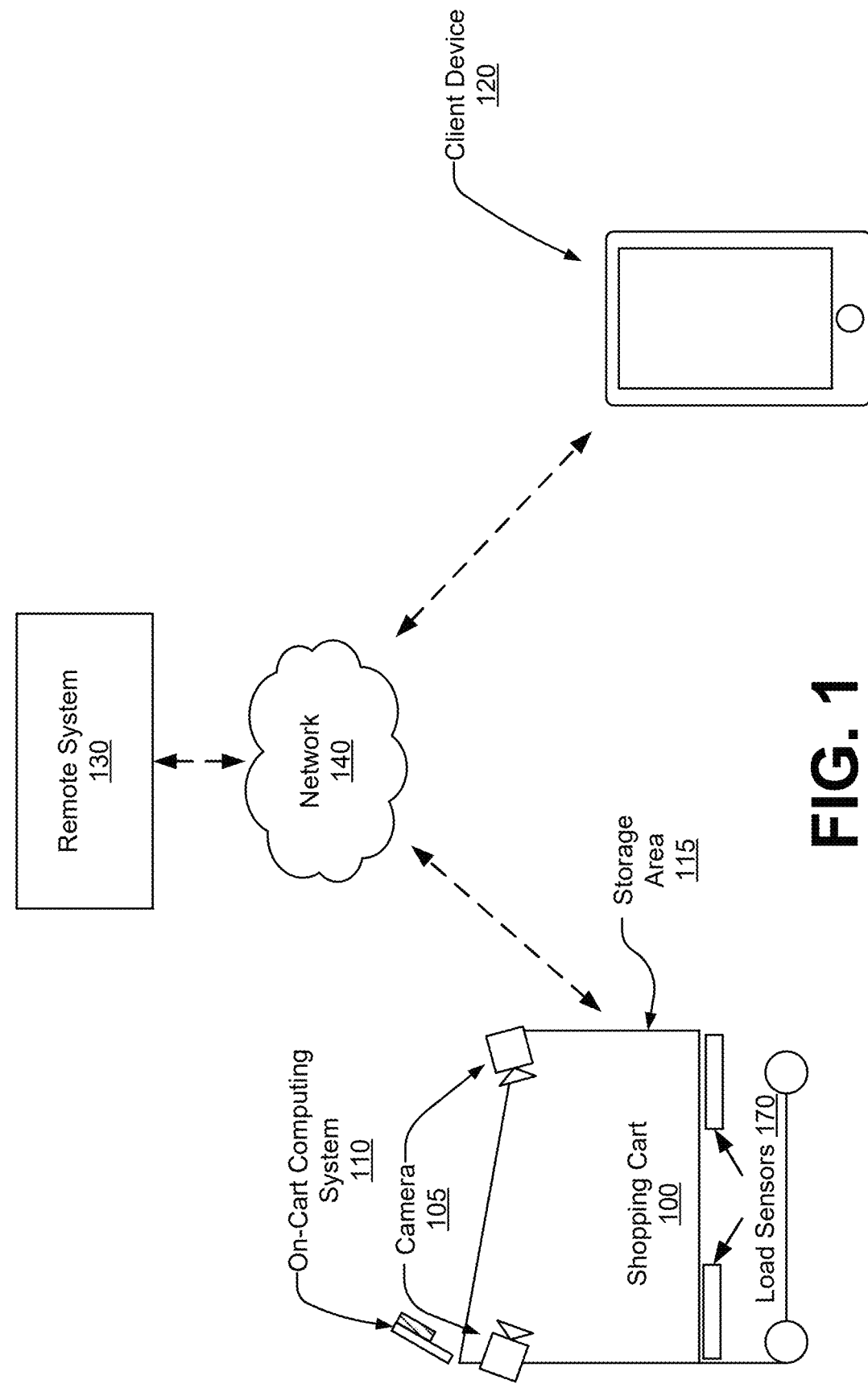
FIG. 1 illustrates an example environment of a smart cart system, in accordance with one or more illustrative embodiments.

FIG. 1 illustrates an example system environment for a smart cart system, in accordance with one or more illustrative embodiments. The system environment illustrated in FIG. 1 includes a shopping cart 100, a client device 120, a remote system 130, and a network 140. Alternative embodiments may include more, fewer, or different components from those illustrated in FIG. 1, and the functionality of each component may be divided between the components differently from the description below. For example, functionality described below as being performed by the shopping cart may be performed, in some embodiments, by the remote system 130 or the client device 120. Similarly, functionality described below as being performed by the remote system 130 may, in some embodiments, be performed by the shopping cart 100 or the client device 120. Additionally, each component may perform their respective functionalities in response to a request from a human, or automatically without human intervention.

A shopping cart 100 is a vessel that a user can use to hold items as the user travels through a store. The shopping cart 100 includes one or more cameras 105 that capture image data of the shopping cart's storage area and a user interface that the user can use to interact with the shopping cart 100. The shopping cart 100 may include additional components not pictured in FIG. 1, such as processors, computer-readable media, power sources (e.g., batteries), network adapters, or sensors (e.g., load sensors, thermometers, proximity sensors).

The cameras 105 capture image data of the shopping cart's storage area. The cameras 105 may capture two-dimensional or three-dimensional images of the shopping cart's contents. The cameras 105 are coupled to the shopping cart 100 such that the cameras 105 capture image data of the storage area from different perspectives. Thus, items in the shopping cart 100 are less likely to be overlapping in all camera perspectives. In some embodiments, the cameras 105 include embedded processing capabilities to process image data captured by the cameras 105. For example, the cameras 105 may be mobile industry processor interface (MIPI) cameras. The cameras 105 may be set to capture images from the area surrounding the shopping cart including the user of the cart. In some embodiments, at least one of the cameras 105 is directed outward, away from the shopping cart 100.

In some embodiments, the shopping cart 100 captures image data in response to detecting that an item is being added to the storage area. The shopping cart 100 may detect that an item is being added to the storage area 115 of the shopping cart 100 based on sensor data from sensors on the shopping cart 100. For example, the shopping cart 100 may detect that a new item has been added when the shopping cart 100 (e.g., load sensors 170) detects a change in the overall weight of the contents of the storage area 115 based on load data from load sensors. Similarly, the shopping cart 100 may detect that a new item is being added based on proximity data from proximity sensors indicating that something is approaching the storage area of the shopping cart 100. The shopping cart 100 may capture image data within a timeframe near when the shopping cart 100 detects a new item. For example, the shopping cart 100 may activate the cameras 105 and store image data in response to detecting that an item is being added to the shopping cart 100 and for some period of time after that detection.

The shopping cart 100 may include one or more sensors that capture measurements describing the shopping cart 100, items in the shopping cart's storage area, or the area around the shopping cart 100. For example, the shopping cart 100 may include load sensors 170 that measure the weight of items placed in the shopping cart's storage area. Load sensors 170 are further described below. Similarly, the shopping cart 100 may include proximity sensors that capture measurements for detecting when an item is added to the shopping cart 100. The shopping cart 100 may transmit data from the one or more sensors to the remote system 130.

The one or more load sensors 170 capture load data for the shopping cart 100. In some embodiments, the one or more load sensors 170 may be scales that detect the weight (e.g., the load) of the content in the storage area 115 of the shopping cart 100. The load sensors 170 can also capture load curves—the load signal produced over time as an item is added to the cart or removed from the cart. The load sensors 170 may be attached to the shopping cart 100 in various locations to pick up different signals that may be related to items added at different positions of the storage area. For example, a shopping cart 100 may include a load sensor 170 at each of the four corners of the bottom of the storage area 115. In some embodiments, the load sensors 170 may record load data continuously while the shopping cart 100 is in use. In other embodiments, the shopping cart 100 may include some triggering mechanism, for example a light sensor, an accelerometer, or another sensor to determine that the user is about to add an item to the shopping cart 100 or about to remove an item from the shopping cart 100. The triggering mechanism causes the load sensors 170 to begin recording load data for some period of time, for example a preset time range.

The shopping cart 100 may include one or more wheel sensors (not shown) that measure wheel motion data of the one or more wheels. The wheel sensors may be coupled to one or more of the wheels on the shopping cart. In some embodiments, a shopping cart 100 includes at least two wheels (e.g., four wheels in the majority of shopping carts) with two wheel sensors coupled to two wheels. In further embodiments, the two wheels coupled to the wheel sensors can rotate about an axis parallel to the ground and can orient about an axis orthogonal or perpendicular to the ground. In other embodiments, each of the wheels on the shopping cart has a wheel sensor (e.g., four wheel sensors coupled to four wheels). The wheel motion data includes at least rotation of the one or more wheels (e.g., information specifying one or more attributes of the rotation of the one or more wheels). Rotation may be measured as a rotational position, rotational velocity, rotational acceleration, some other measure of rotation, or some combination thereof. Rotation for a wheel is generally measured along an axis parallel to the ground. The wheel rotation may further include orientation of the one or more wheels. Orientation may be measured as an angle along an axis orthogonal or perpendicular to the ground. For example, the wheels are at 0° when the shopping cart is moving straight and forward along an axis running through the front and the back of the shopping cart. Each wheel sensor may be a rotary encoder, a magnetometer with a magnet coupled to the wheel, an imaging device for capturing one or more features on the wheel, some other type of sensor capable of measuring wheel motion data, or some combination thereof.

The shopping cart 100 includes an on-cart computing system 110 that enables the user to perform an automated checkout through the shopping cart 100. The computing system includes a processor and a non-transitory computer-readable medium that stores instructions that may be executed by the processor. The computing system 110 also may include a display, a speaker, a microphone, a keypad, or a payment system (e.g., a credit card reader). The computing system 110 also includes a wireless network adapter that allows the computing system to communicate via the network 140.

The on-cart computing system 110 allows a customer at a brick-and-mortar store to complete a checkout process in which items are scanned and paid for without having to go through a human cashier at a point-of-sale station. The on-cart computing system 110 receives data describing a user's shopping trip in a store and generates a shopping list based on items that the user has selected. For example, the on-cart computing system 110 may receive data from cameras or sensors coupled to the shopping cart 100 and may determine, based on the data, which items the user has added to their cart.

The on-cart computing system 110 may use machine-learning models or computer-vision techniques to identify items that the user adds to the shopping cart. For example, the on-cart computing system 110 may apply a barcode detection model to images captured by a camera of the shopping cart to identify items based on the barcodes that are visible to the camera. The barcode detection model is a machine-learning model (e.g., a neural network) that is trained to identify item identifiers that are encoded in barcodes that are depicted in image data. The barcode detection model may be trained based on a set of training examples. Each of the training examples may include an image of a barcode and a label that indicates what item identifier encoded by the barcode. In some embodiments, the on-cart computing system 110 preprocesses the image before applying the barcode detection model to the image. For example, the on-cart computing system may rotate the image so that the barcode is aligned with a set direction or may crop an image of an item to a portion of the image that depicts the barcode. U.S. patent application Ser. No. 17/703,076, entitled "Image-Based Barcode Decoding" and filed Mar. 24, 2022, describes an example barcode detection model in accordance with some embodiments and is incorporated by reference.

The on-cart computing system also may store and apply an optical character recognition (OCR) model to the image. An OCR model is a machine-learning model that converts typed, handwritten, or printed text depicted in images into machine-readable text. The on-cart computing system applies the OCR model to images captured by the cameras to identify items depicted in those images. For example, the on-cart computing system may generate a set of OCR text for an image. This OCR text is text that the OCR model has identified as being depicted in the image. The on-cart computing system uses the OCR text to identify items in images. For example, the on-cart computing system may apply another machine-learning model (e.g., a large language model) to the OCR text to predict which item is depicted in the image based on the OCR text.

In some embodiments, the on-cart computing system uses an item lookup table to identify items depicted in an image based on OCR text extracted from that image. The item lookup table stores a set of items that may be depicted in images captured by the cameras and corresponding text that is associated with each of the items. The on-cart computing system stores the item lookup table for use in identifying items. For example, the on-cart computing system may compare OCR text from an image to the corresponding text for each of the items to identify items depicted in images. The on-cart computing system may identify the item by identifying which item in the item lookup table has the most characters or words in common with the OCR text or which item has the longest sequence of characters in common with the OCR text. In some embodiments, rather than storing text in the item lookup table, the item lookup table stores embeddings that represent text associated with items. In these embodiments, the on-cart computing system may generate an embedding for OCR text and compare that embedding to the embeddings stored in the item lookup table to identify the item.

Furthermore, the on-cart computing system may store and apply an image embedding model to captured images to identify items. The image embedding model is a machine-learning model that is trained to generate embeddings for images captured by the cameras. The on-cart computing system applies the image embedding model to images captured by the cameras of the shopping cart and uses the embeddings to identify which items are depicted in the images. For example, the on-cart computing system may store embeddings that correspond to items that a user may place in the shopping cart. Each item may be associated with a single embedding or multiple embeddings. The on-cart computing system applies the image embedding model to images captured by the cameras and compares the generated embeddings to stored embeddings for items. The on-cart computing system identifies which item or items are depicted in an image based on how similar the generated embeddings are to the stored embeddings corresponding to the item(s). For example, the on-cart computing system may compute a distance, dot product, or cosine similarity between the embeddings to identify the item in the images. U.S. patent application Ser. No. 17/726,385, entitled "System for Item Recognition using Computer Vision" and filed Apr. 21, 2022, describes example methodologies for identifying items using a machine-learning model and is incorporated by reference.

Any of these models may be sensor fusion models that take sensor data as additional inputs. For example, a model may use weight data from a load sensor or proximity data from a proximity sensor as an additional input to predict an identifier for an item added to the shopping cart.

The on-cart computing system 110 generates a shopping list for the user as the user adds items to the shopping cart 100. The shopping list is a list of items that the user has gathered in the storage area 115 of the shopping cart 100 and intends to purchase. The shopping list may include identifiers for the items that the user has gathered (e.g., stock keeping units (SKUs)) and a quantity for each item. When the user indicates that they are done shopping at the store, the on-cart computing system 110 interfaces with the remote system 130 to facilitate a transaction between the user and the store for the user to purchase their selected items. For example, the on-cart computing system 110 may receive payment information from the user through a user interface and transmit that payment information to the remote system 130.

The user interface of the on-cart computing system 110 may allow the user to adjust the items in their shopping list or to provide payment information for a checkout process. Additionally, the user interface may display a map of the store indicating where items are located within the store. In some embodiments, a user may interact with the user interface to search for items within the store, and the user interface may provide a real-time navigation interface for the user to travel from their current location to an item within the store. The user interface also may display additional content to a user, such as suggested recipes or items for purchase. In some embodiments, the on-cart computing system 110 may receive content from the remote system 130 to display to the user. For example, the on-cart computing system may receive item recommendations, recipe recommendations, or brand recommendations from the remote system 130.

The on-cart computing system may include a tracking system configured to track a position, an orientation, movement, or some combination thereof of the shopping cart 100 in an indoor environment. The tracking system may further include other sensors capable of capturing data useful for determining position, orientation, movement, or some combination thereof of the shopping cart. Other example sensors include, but are not limited to, an accelerometer, a gyroscope, etc. The tracking system may provide real-time location of the shopping cart to an online system and/or database. The location of the shopping cart may inform content to be displayed by the user interface. For example, if the shopping cart 100 is located in one aisle, the display can provide navigational instructions to a user to navigate them to a product in the aisle. In other example use cases, the display can provide suggested products or items located in the aisle based on the user's location.

A user can also interact with the shopping cart 100 or the remote system 130 through a client device 120. The client device 120 can be a personal or mobile computing device, such as a smartphone, a tablet, a laptop computer, or desktop computer. In some embodiments, the client device 120 executes a client application that uses an application programming interface (API) to communicate with the remote system 130 through the network 140. The client device 120 may allow the user to add items to a shopping list and to checkout through the remote system 130. For example, the user may use the client device 120 to capture image data of items that the user is selecting for purchase, and the client device 120 may provide the image data to the remote system 130 to identify the items that the user is selecting. The client device 120 may adjust the user's shopping list based on the identified item. In some embodiments, the user can also manually adjust their shopping list through the client device 120.

In some embodiments, the on-cart computing system 110, the camera(s), and the sensors of the shopping cart are separately mounted to the shopping cart. Alternatively, the on-cart computing system 110, camera(s), and sensors may be contained within a single casing that is mounted to the shopping cart. This single casing may contain all of the components needed by the on-cart computing system 110 to perform the functionalities described herein. The single casing may be permanently mounted to the shopping cart or may be configured to be easily attached to or detached from the shopping cart. This latter embodiment may enable the on-cart computing system 110 to be recharged at a separate station from the shopping cart or may allow the computing system 110 to be easily mounted to pre-existing shopping carts, rather than requiring specially built shopping carts.

The shopping cart 100 and client device 120 can communicate with the remote system 130 via a network 140. The network 140 is a collection of computing devices that communicate via wired or wireless connections. The network 140 may include one or more local area networks (LANs) or one or more wide area networks (WANs). The network 140, as referred to herein, is an inclusive term that may refer to any or all of standard layers used to describe a physical or virtual network, such as the physical layer, the data link layer, the network layer, the transport layer, the session layer, the presentation layer, and the application layer. The network 140 may include physical media for communicating data from one computing device to another computing device, such as MPLS lines, fiber optic cables, cellular connections (e.g., 3G, 4G, or 5G spectra), or satellites. The network 140 also may use networking protocols, such as TCP/IP, HTTP, SSH, SMS, or FTP, to transmit data between computing devices. In some embodiments, the network 140 may include Bluetooth or near-field communication (NFC) technologies or protocols for local communications between computing devices. The network 140 may transmit encrypted or unencrypted data.

The remote system 130 communicates with the on-cart computing system 110 of the shopping cart to provide an automated checkout experience for the user. The remote system 130 may facilitate the user's payment for the items in the shopping cart. For example, the remote system 130 may receive the user's shopping list from the shopping cart and charges the user for the cost of the items in the cart. The remote system 130 may communicate with other systems to execute the transaction, such as a computing system of the retailer or of a financial institution. The remote system 130 may receive payment information from the shopping cart 100 and uses that payment information to charge the user for the items. Alternatively, the remote system 130 may store payment information for the user in user data describing characteristics of the user. The remote system 130 may use the stored payment information as default payment information for the user and charge the user for the cost of the items based on that stored payment information.

In some embodiments, the remote system 130 establishes a session for a user to associate the user's actions with the shopping cart 100 to that user. The user may establish the session by inputting a user identifier (e.g., phone number, email address, username, etc.) into a user interface of the remote system 130. The user also may establish the session through the client device 120. The user may use a client application operating on the client device 120 to associate the shopping cart 100 with the client device 120. The user may establish the session by inputting a cart identifier for the shopping cart 100 through the client application, e.g., by manually typing an identifier or by scanning a barcode or QR code on the shopping cart 100 using the client device 120. In some embodiments, the remote system 130 establishes a session between a user and a shopping cart 100 automatically based on sensor data from the shopping cart 100 or the client device 120. For example, the remote system 130 may determine that the client device 120 and the shopping cart 100 are in proximity to one another for an extended period of time, and thus may determine that the user associated with the client device 120 is using the shopping cart 100.

The remote system 130 may also provide content to the on-cart computing system 110 to display to the user while the user is operating the shopping cart. For example, the remote system 130 may use stored user data associated with the user of the shopping cart to select content that the user is most likely to interact with. The remote system 130 may transmit that content to the on-cart computing system for display to the user. The remote system 130 may also provide other data to the on-cart computing system. For example, the remote system 130 may store item data describing items in the store and the remote system 130 may provide that item data to the on-cart computing system for the on-cart computing system to use to identify items.

In some embodiments, a user who interacts with the shopping cart 100 or the client device 120 may be an individual shopping for themselves or a shopper for an online concierge system. The shopper is a user who collects items from a store on behalf of a user of the online concierge system. For example, a user may submit a list of items that they would like to purchase. The online concierge system may transmit that list to a shopping cart 100 or a client device 120 used by a shopper. The shopper may use the shopping cart 100 or the client device 120 to add items to the user's shopping list. When the shopper has gathered the items that the user has requested, the shopper may perform a checkout process through the shopping cart 100 or client device 120 to charge the user for the items. U.S. Pat. No. 11,195,222, entitled "Determining Recommended Items for a Shopping List," issued Dec. 7, 2021, describes online concierge systems in more detail, which is incorporated by reference herein in its entirety.

Figure 2:
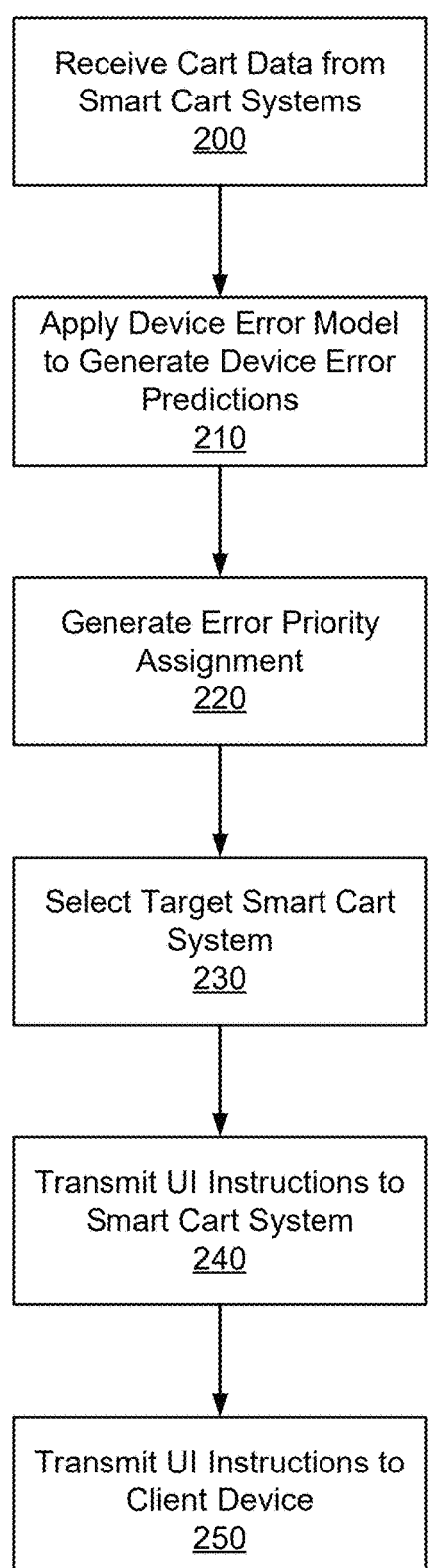
FIG. 2 is a flowchart for an example method for determining maintenance priorities for smart cart systems, in accordance with some embodiments.

FIG. 2 is a flowchart for an example method for determining maintenance priorities for smart cart systems, in accordance with some embodiments. Alternative embodiments may include more, fewer, or different steps, or may perform the steps in a different order, from that illustrated in FIG. 2. Additionally, while the method is primarily described as being performed by a cart management system (e.g., remote system 130), some or all of the steps may be performed by a smart cart system.

A cart management system receives 200 cart data from a set of smart cart systems. Cart data is data describing characteristics of a smart cart system. For example, the cart data may include senor data captured by sensors coupled to the smart cart system. Example sensors that may be coupled to a smart cart system include a load sensor, an inertial measurement unit, a rotary encoder (e.g., coupled to a wheel of the smart cart system), a battery measurement sensor, or a camera. The cart data also may include log data generated by an on-cart computing system of the smart cart system. For example, the on-cart computing system may generate log data describing actions or events relating to an operating system or a client application operating on the smart cart system. The log data may describe the smart cart system's maintenance history, when the smart cart was last connected to a charging station, or a version of software operating on the smart cart system.

The cart management system may regularly receive cart data from the set of smart cart systems or may receive the cart data in response to instructions transmitted to the smart cart systems to provide the cart data. The set of smart carts may be a set of smart cart systems associated with a particular location (e.g., a particular store to which the smart cart systems were deployed).

The cart management system applies 210 a device error model to generate device error predictions for the set of smart carts. A device error is an error, issue, or deviation from intended functionality of a smart cart system. Example device errors include malfunctioning hardware (e.g., a sensor, a display, or a wheel), out-of-date software, or even low battery charge on the smart cart system. A device error prediction is a predicted likelihood that a device error will occur within some time period. For example, the device prediction may be a prediction that a device error will occur within some upcoming time period (e.g., within the next 24 hours) or during some set time period. A device error prediction may be a prediction that any kind of device error occurs or may be a prediction that a particular device error type occurs. A device error type may be a specific device error or may be a category that encompasses multiple specific device errors.

The cart management system uses a device error model to generate device error predictions. A device error model is a machine-learning model (e.g., a neural network) that is trained to generate device error predictions based on cart data. The device error model may be a single machine-learning model that generates one type of device error prediction or may be multiple machine-learning models that each generate a particular type of device error prediction. In some embodiments, the device error model is a single model (e.g., a multiple classifier) that is trained to generate device error predictions for all types of device error predictions.

The device error model is trained based on training data generated based on historical cart data from smart cart systems. For example, the cart management system may generate a set of training examples to train the device error model. Each training example comprises cart data for a smart cart system captured over a time period and a label indicating whether a device error occurred during the time period over which the cart data was captured. The label may indicate whether a device error of a particular device error type occurred or may indicate whether each of a set of device error types occurred. The cart management system trains the device error model based on a training example by applying the device error model to the cart data of the training example and comparing an output from the device error model to the label(s) of the training example.

In some embodiments, the cart management system generates a device error prediction based on a mismatch between a measured weight of an item and a known or expected weight of that item. For example, the cart management system may measure the weight of a particular item across a number of smart cart systems and may generate an expected weight (e.g., an average weight) for that item based on the measured weights. However, where a load sensor of a smart cart system is faulty, the weight that the smart cart system measures for the item may differ from the weight measured by the other systems. When the measured weight for the item differs by a threshold amount from the expected weight of the item, the cart management system may determine that the load sensor of the measuring smart cart system is likely to be faulty. The cart management system may also base its determining that the load sensor is faulty on a confidence in an item identification model that the item has been correctly identified (e.g., may require that a confidence score in the item's identification exceeds a threshold value). In some embodiments, the cart management system uses the device error prediction generated based on the mismatch between the expected and measured weight of an item to label a training example.

The cart management system generates 220 an error priority assignment for the set of smart cart systems based on the generated sets of device error predictions. An error priority assignment is an assignment of relative priority of servicing or providing maintenance to each of the smart cart systems. For example, the error priority assignment may be a ranked list that represents an order or priority of which smart cart systems should be serviced or have maintenance. Similarly, the error priority assignment may be a schedule indicating when each smart cart system should be serviced. The cart management system generates the error priority assignment based on the generated device error predictions. For example, the cart management system may give higher priority to smart cart systems that have a higher likelihood of experiencing a device error than to smart cart systems with a lower likelihood of experiencing a device error. Similarly, the cart management system may generate the error priority assignment based on a hierarchy of device errors. A device error hierarchy represents a relative severity of each type of device error. For example, the hierarchy may be a ranked list of device errors or may be a set of scores that represent the severity of the device error types. In some embodiments, the cart management system uses the device error hierarchy to weight the device error predictions generated for a smart cart system to compute an expected value of device error for each of the set of smart cart systems. The cart management system may use these expected values to generate the error priority assignment.

In some embodiments, the cart management system uses an optimization algorithm to generate the error priority assignment for the smart cart system. For example, the cart management system may optimize to reduce an overall likelihood of any device error occurring on any of the smart cart systems. Similarly, the cart management system may use the device error hierarchy to perform the optimization algorithm by, for example, optimizing to reduce an overall expected value of device errors across the set of smart cart systems.

The cart management system selects 230 a target smart cart system based on the generated error priority assignment. For example, the cart management system may simply select the next smart cart system in a priority list or may select a subset of the smart cart systems whose maintenance or servicing is coming up in a generated schedule. In some embodiments, the cart management system selects a certain number of smart cart systems based on cart usage data describing how much smart cart systems are being used at a particular location to which the smart cart systems are deployed. For example, if the smart cart systems are in high demand (e.g., more than a threshold number of smart cart systems are being used during a period of time), the cart management system may select fewer smart cart systems.

The cart management system transmits 240 instructions to the target smart cart system(s) to present a user interface on a display of the target smart cart system. The user interface may instruct users not to use the target smart cart system and may instruct users to use a different smart cart system available at the location. The cart management system also may transmit instructions to one or more other smart cart systems at the same location instructing users to use those smart cart systems. For example, another smart cart system may present a user interface with a message like "Use This Cart Next." The cart management system may select a smart cart system that should be used next by users based on how long it has been since each smart cart system was last used. For example, the cart management system may prioritize smart cart systems that have not been used for a longer amount of time to spread the use of the smart cart systems evenly and to avoid issues that stem from disuse of the smart cart system.

In some embodiments, the cart management system transmits 250 instructions to a client device associated with a user of the cart management system to perform service or maintenance on the target smart cart system. The instructions cause the client device to present a user interface to the user identifying the target smart cart system and instructing the user to perform certain maintenance actions with regards to the target smart cart system. The user interface may specify a predicted device error that may occur for the target smart cart system or may specify which maintenance actions for the user to perform.

In some embodiments, the cart management system receives feedback from the client device or a smart cart system and uses the feedback to retrain the device error model. For example, the cart management system may receive feedback that a predicted error that occurred with a smart cart system did not actually happen. The cart management system may generate training examples based on the feedback and retrain the device error model based on the new training examples.

Figure 3:
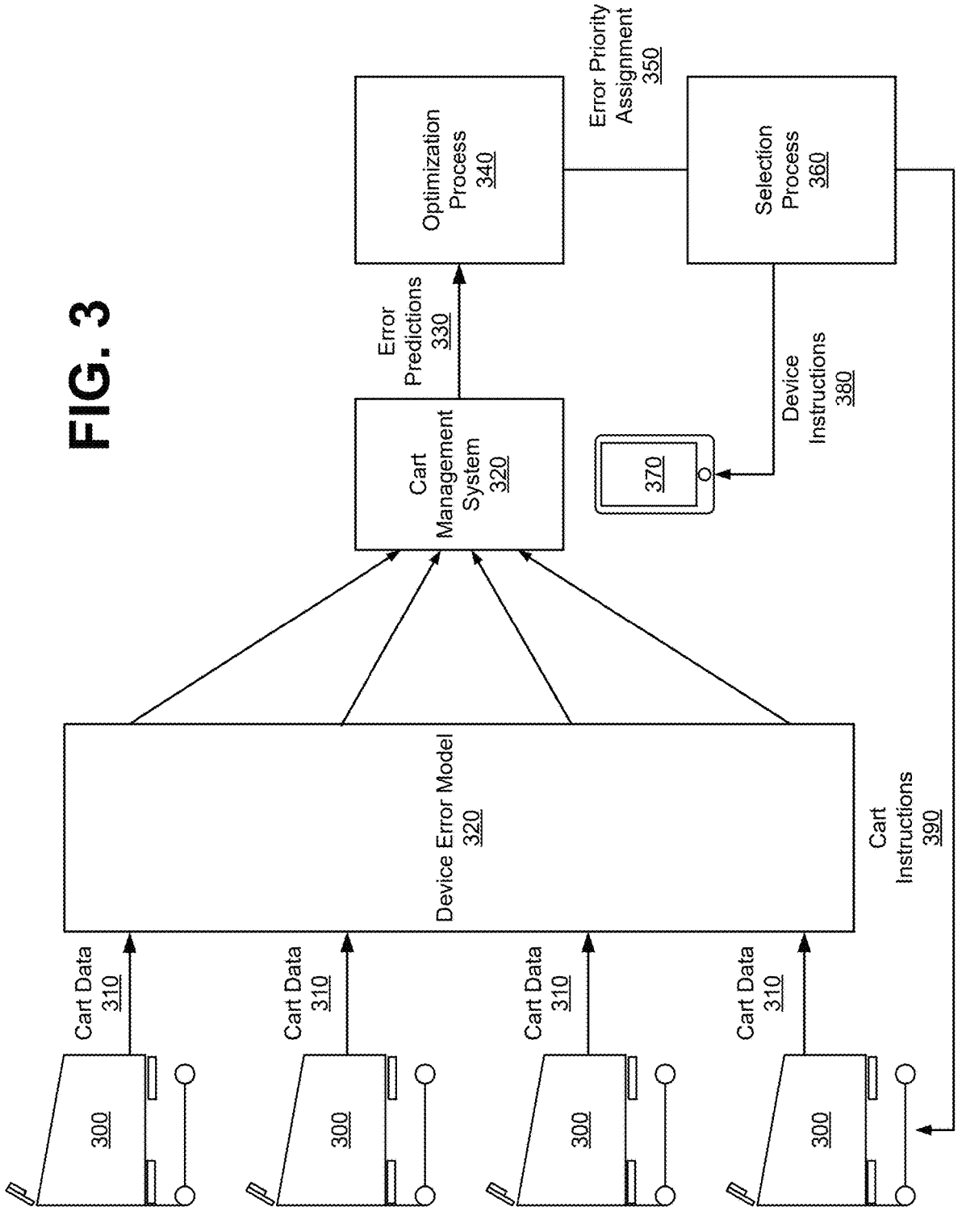
FIG. 3 illustrates an example data flow through a cart management system for the generation and use of an error priority assignment, in accordance with some embodiments.

FIG. 3 illustrates an example data flow through a cart management system for the generation and use of an error priority assignment, in accordance with some embodiments. The cart management system receives cart data 310 from a set of smart cart systems 300. The cart management system applies a device error model 320 to the cart data to generate a set of device error predictions 330 for each smart cart system. The cart management system applies an optimization process 340 to the sets of device error predictions to generate an error priority assignment 350. The cart management system uses the error priority assignment in a selection process 360 to instruct a client device 370 of a user to display instructions 380 to the user to service a selected smart cart system. The cart management system also transmits instructions 390 to the selected smart cart system to display a user interface indicating that the smart cart system will be serviced.

Other Considerations

The foregoing description of the embodiments has been presented for the purpose of illustration; it is not intended to be exhaustive or to limit the scope of the disclosure. Many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some embodiments, a software module is implemented with a computer program product comprising one or more computer-readable media containing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to an apparatus for performing the operations herein. This apparatus may be specially constructed for the required purposes, or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The weights may be stored on one or more computer-readable media, and are used by a system when applying the machine-learning model to new data.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C having at least one element in the combination that is true (or present). As a not-limiting example, the condition "A, B, or C" is satisfied by A and B are true (or present) and C is false (or not present). Similarly, as another not-limiting example, the condition "A, B, or C" is satisfied by A is true (or present) and B and C are false (or not present).

What is claimed is:

1. A method, performed at a computing system comprising a processor and a non-transitory computer-readable medium, comprising:
   receiving, at a remote system, cart data, wherein the cart data comprises sensor data captured by sensors coupled to a plurality of smart cart systems;
   accessing a device error model, wherein the device error model is a machine-learning model trained to generate device error predictions based on input sensor data captured by sensors coupled to a smart cart system;
   applying the device error model to the received sensor data for each of the plurality of smart cart systems to generate sets of device error predictions, one for each of the plurality of smart cart systems, wherein each device error prediction corresponds to a device error type of a set of device error types and represents a likelihood of a device error of a corresponding device error type will occur for a smart cart system during a target time period;
   generating an error priority assignment for the plurality of smart cart systems based on the generated sets of device error predictions for each of the plurality of smart cart systems and a hierarchy for the set of device error types, wherein the hierarchy for the set of device error types represents a relative severity of each of the set of device error types and wherein the error priority assignment represents an expected value of a device error occurring for each of the smart cart systems during the time period;
   selecting a target smart cart system of the plurality of smart cart systems based on the error priority assignment;
   transmitting, during the time period, instructions to the target smart cart system of the plurality of smart cart systems, wherein the instructions cause the target smart cart system to present a user interface on a display of the target smart cart system, wherein the user interface instructs users not to use the target smart cart system; and
   transmitting instructions to a client device associated with an operator user of the remote system, wherein the instructions to the client device cause the client device to present a user interface identifying the target smart cart system.

2. The method of claim 1, wherein the cart data comprises log data generated by on-cart computing systems of the plurality of smart cart systems.

3. The method of claim 1, wherein the device error model is a multiple classifier that is trained to generate a set of device error predictions based on cart data.

4. The method of claim 1, wherein the device error model comprises a set of machine-learning models, wherein each machine-learning model is trained to generate one of a set of device error predictions based on cart data.

5. The method of claim 1, wherein the device error model is trained based on a set of training examples, wherein each training example comprises historical cart data captured by a smart cart system during a period of time and a label indicating whether a device error occurred during that period of time.

6. The method of claim 1, wherein generating the error priority assignment comprises:

generating the error priority assignment based on a last time that each smart cart system of the plurality of smart cart systems was used.

7. The method of claim 1, wherein generating the error priority assignment comprises:
   generating the error priority assignment by applying an optimization algorithm to the set of device error predictions and the hierarchy for the set of device error types.

8. The method of claim 1, wherein generating the error priority assignment comprises:
   weighting each of the device error predictions based on a corresponding score for a corresponding device error type in the hierarchy for the set of device error types.

9. The method of claim 1, wherein selecting the target smart cart system comprises:
   selecting the target smart cart system based on usage data describing usage of the plurality of smart cart systems at a location to which the set of smart cart systems are located.

10. The method of claim 1, further comprising:
   selecting another smart cart system of the plurality of smart cart systems; and
   transmitting instructions to present a user interface on the other smart cart system that displays instructions to users to use the other smart cart system.

11. The method of claim 1, further comprising:
   receiving feedback from the client device or the target smart cart system; and
   retraining the device error model based on the received feedback.

12. A non-transitory computer-readable medium storing instructions that, when executed by a processor, cause the processor to perform operations comprising:
   receiving, at a remote system, cart data, wherein the cart data comprises sensor data captured by sensors coupled to a plurality of smart cart systems;
   accessing a device error model, wherein the device error model is a machine-learning model trained to generate device error predictions based on input sensor data captured by sensors coupled to a smart cart system;
   applying the device error model to the received sensor data for each of the plurality of smart cart systems to generate sets of device error predictions, one for each of the plurality of smart cart systems, wherein each device error prediction corresponds to a device error type of a set of device error types and represents a likelihood of a device error of a corresponding device error type will occur for a smart cart system during a target time period;
   generating an error priority assignment for the plurality of smart cart systems based on the generated sets of device error predictions for each of the plurality of smart cart systems and a hierarchy for the set of device error types, wherein the hierarchy for the set of device error types represents a relative severity of each of the set of device error types and wherein the error priority assignment represents an expected value of a device error occurring for each of the smart cart systems during the time period;
   selecting a target smart cart system of the plurality of smart cart systems based on the error priority assignment;
   transmitting, during the time period, instructions to the target smart cart system of the plurality of smart cart systems, wherein the instructions cause the target smart cart system to present a user interface on a display of the target smart cart system, wherein the user interface instructs users not to use the target smart cart system; and transmitting instructions to a client device associated with an operator user of the remote system, wherein the instructions to the client device cause the client device to present a user interface identifying the target smart cart system.

13. The non-transitory computer-readable medium of claim 12, wherein the device error model is a multiple classifier that is trained to generate a set of device error predictions based on cart data.

14. The non-transitory computer-readable medium of claim 12, wherein the device error model comprises a set of machine-learning models, wherein each machine-learning model is trained to generate one of a set of device error predictions based on cart data.

15. The non-transitory computer-readable medium of claim 12, wherein the device error model is trained based on a set of training examples, wherein each training example comprises historical cart data captured by a smart cart system during a period of time and a label indicating whether a device error occurred during that period of time.

16. The non-transitory computer-readable medium of claim 12, wherein generating the error priority assignment comprises:

generating the error priority assignment based on a last time that each smart cart system of the plurality of smart cart systems was used.

17. The non-transitory computer-readable medium of claim 12, wherein generating the error priority assignment comprises:

generating the error priority assignment by applying an optimization algorithm to the set of device error predictions and the hierarchy for the set of device error types.

18. The non-transitory computer-readable medium of claim 12, wherein generating the error priority assignment comprises:

weighting each of the device error predictions based on a corresponding score for a corresponding device error type in the hierarchy for the set of device error types.

19. The non-transitory computer-readable medium of claim 12, wherein selecting the target smart cart system comprises:

selecting the target smart cart system based on usage data describing usage of the plurality of smart cart systems at a location to which the set of smart cart systems are located.

20. A system comprising:

a processor; and a non-transitory computer-readable medium storing instructions that, when executed by the processor, cause the processor to perform operations comprising:

receiving, at a remote system, cart data, wherein the cart data comprises sensor data captured by sensors coupled to a plurality of smart cart systems;

accessing a device error model, wherein the device error model is a machine-learning model trained to generate device error predictions based on input sensor data captured by sensors coupled to a smart cart system;

applying the device error model to the received sensor data for each of the plurality of smart cart systems to generate sets of device error predictions, one for each of the plurality of smart cart systems, wherein each device error prediction corresponds to a device error type of a set of device error types and represents a likelihood of a device error of a corresponding device error type will occur for a smart cart system during a target time period;

generating an error priority assignment for the plurality of smart cart systems based on the generated sets of device error predictions for each of the plurality of smart cart systems and a hierarchy for the set of device error types, wherein the hierarchy for the set of device error types represents a relative severity of each of the set of device error types and wherein the error priority assignment represents an expected value of a device error occurring for each of the smart cart systems during the time period;

selecting a target smart cart system of the plurality of smart cart systems based on the error priority assignment;

transmitting, during the time period, instructions to the target smart cart system of the plurality of smart cart systems, wherein the instructions cause the target smart cart system to present a user interface on a display of the target smart cart system, wherein the user interface instructs users not to use the target smart cart system; and transmitting instructions to a client device associated with an operator user of the remote system, wherein the instructions to the client device cause the client device to present a user interface identifying the target smart cart system.

* * * * *